United States Patent [19]
Sanga et al.

[11] 3,960,760
[45] June 1, 1976

[54] SEWER WASTE WATER TREATING AGENT PRODUCED FROM WASTE CRACKING CATALYST

[75] Inventors: Seiji Sanga, Toyonaka; Yoichi Nishimura, Komae, both of Japan

[73] Assignee: Catalysts and Chemicals Industries Co., Ltd., Tokyo, Japan

[22] Filed: June 28, 1974

[21] Appl. No.: 483,922

[30] Foreign Application Priority Data
Nov. 2, 1973  Japan................................ 48-122895

[52] U.S. Cl................................. 252/412; 252/179; 252/455 R; 252/455 Z; 210/24
[51] Int. Cl.$^2$........................................... B01J 29/06
[58] Field of Search................ 252/179, 455 R, 412, 252/455 Z; 210/32, 38, 24

[56] References Cited
UNITED STATES PATENTS
| | | | |
|---|---|---|---|
| 1,636,942 | 7/1927 | Prather | 252/179 |
| 2,480,627 | 8/1949 | Bodkin et al. | 252/412 |

*Primary Examiner*—Ralph S. Kendall
*Assistant Examiner*—Edith R. Buffalow
*Attorney, Agent, or Firm*—Woodhams, Blanchard and Flynn

[57] ABSTRACT

A sewer waste-water treating agent of superior quality produced by alkali treatment of waste catalyst grains arising from the fluid-bed type catalytic cracking process, said sewer waste-water treating agent being capable of facilitating solid-liquid separation.

2 Claims, No Drawings

SEWER WASTE WATER TREATING AGENT PRODUCED FROM WASTE CRACKING CATALYST

BACKGROUND OF THE INVENTION

The present invention relates to a method of manufacturing a sewer waste-water treating agent by utilizing as material the waste silica-alumina catalyst (or F.C.C. catalyst) discarded after serving as the catalyst for the fluid-bed type cracking of petroleum, and it is intended to provide a sewer waste-water treating agent which is not only effective for removing ammoniacal nitrogen and heavy metal ions contained in sewer waste-water but also convenient for solid-liquid separation.

The sewer waste-water generally contains varieties of harmful substances, and these substances would give rise to various troubles in daily life. For instance, ammoniacal nitrogen, phosphate and the like are said to cause an extraordinary growth of microbes in lakes and marshes, rivers and the sea as they constitute a source of nutrition for microbes in water. Also, it is a well known fact that the ions of heavy metal, such as cadmium, lead, copper, etc. have a very bad influence upon the human body. From this point of view, the treatment of sewer waste-water aimed at the removal of the above-mentioned harmful substances is considered indispensable, and accordingly, various studies are under way. The treatment of sewer waste-water for this purpose has ordinarily been conducted by applying the active sludge process, the active carbon process and the like, but, according to these processes, ammoniacal nitrogen can not be removed satisfactorily. Therefore, for the purpose of removing ammoniacal nitrogen, such processes as oxidation by utilizing microbes or airstripping have been employed, but these processes are all defective in that the process per se is intricate and costly. As to the removal of heavy metals contained in sewer waste-water, in addition to the ion-exchange process employing ion-exchange resin, the process of treating with chemicals, the process of treating with active carbon, etc. have been applied, but these processes are not very practical inasmuch as they are too expensive in respect of the cost of the required apparatus and/or the cost of operation thereof.

On the other hand, there has also been tried a process of removing ammoniacal nitrogen and/or heavy metal ions by utilizing zeolite or a natural silicate such as clay minerals. This process seems to utilize the cation-exchange property inherent in the natural zeolite or clay minerals, and indeed it is effective for removing ammoniacal nitrogen and/or heavy metal ions. However, this process is defective in that, inasmuch as the natural zeolite and other clay minerals, when brought in contact with water, are apt to give rise to disintegration of grains to turn into very fine particles, rendering it difficult to perform solid-liquid separation, and therefore a special care must be taken in practicing this process industrially.

By the way, the amount of consumption of silica-alumina catalyst has shown a yearly increase with the recent growth of petroleum industry, and at present it is consumed in an amount of as much as about 100,000 tons a year. This means that the same amount of waste catalyst has been discharged annually, while as for the means of disposal of this enormous volume of waste catalyst, the method of burying it in the ground has so far been exclusively adopted. However, a waste catalyst of this kind is composed essentially of ingredients similar to zeolite and is in the form of a firm sinter as a result of repeated exposure to high temperatures within the cracking apparatus. Therefore, subject to imparting cation-exchange property similar to that of the above-mentioned natural zeolite by treating said waste catalyst in some way or other, not only an effective utilization of waste catalyst is feasible but also there can be produced a sewer waste-water treating agent useful for the removal of ammoniacal nitrogen and/or heavy metal ions and free of disintegration even when brought in contact with water.

SUMMARY OF THE INVENTION

The present invention has been achieved on the basis of the foregoing concept, and it is intended to obtain a sewer waste-water treating agent capable of demonstrating a superb efficiency in removing ammoniacal nitrogen and/or heavy metal ions, said treating agent being produced by subjecting waste silica-alumina catalyst discarded after serving for cracking reaction to treatment with alkali under the below-mentioned specific conditions.

The silica-alumina catalyst is intrinsically amorphous, so that a waste silica-alumina catalyst as it is retains but a scanty cation-exchange property. According to the present invention, however, even this waste catalyst can be imparted with an ability to adsorb and remove ammoniacal nitrogen and/or heavy metal ions contained in sewer waste-water subject to simple treatment with sodium hydroxide. But, the conditions for said treatment with sodium hydroxide are very important. For example, as is commonly known, silica-alumina changes into hydroxy sodalite when thoroughly treated with alkali, and this hydroxy sodalite is admittedly effective for removing ammoniacal nitrogen but is not always suitable for removing heavy metal ions. Such being the case, in order to remove both ammoniacal nitrogen and heavy metal ions, the alkali treatment of waste catalyst must be conducted very carefully. According to the present invention, therefore, said alkali treatment of waste catalyst is to be conducted at a temperature in the range of 70°C – 105°C for 2 – 48 hours upon adding 50 – 100 ml of an aqueous solution of sodium hydroxide having a concentration in the range of 0.2N – 5N per 10 g of waste catalyst, and by virtue of this treatment there is obtained a substance effective for removing ammoniacal and heavy metal ions.

As will be understood from the above description, according to the method of the present invention, not only an effective utilization of waste silica-alumina cracking catalyst is feasible but also the sewer waste-water treating catalyst produced thereby is very narrow in the distribution of grain size thereof (the mean diameter of grains is said to be about 200$\mu$) inasmuch as it employs waste catalyst as material and is free from disintegration in the water. Therefore, the sewer waste-water treating agent according to the present invention has a merit that it facilitates the separation from the sewer waste-water by precipitation, filtration and the like, and can minimize the difficulty in solid-liquid separation unlike the conventional catalysts employing native materials.

DESCRIPTION OF THE PREFERRED EMBODIMENTS

Example 1

By adding 250 ml of an aqueous solution of sodium hydroxide having the concentration of 2.5N to 50 g of waste catalyst, heating the mixture at 95°C for 3 hours, removing the supernatant liquid thereafter, washing the precipitate thoroughly and drying the washed precipitate at 110°C, a powder was obtained. When the identification of this powder was conducted by the diffraction of X-rays, there were observed diffraction fringes indicating slight formation of faujasite-type zeolite and sodalite but no other crystalline substance, and the greater part of the powder was amorphous. 2 g of this powder were added to 150 ml of an aqueous solution of ammonium chloride containing 50 ppm of ammoniacal nitrogen, and after 3 hours' stirring, solid-liquid separation was effected. When the thus separated liquid was subjected to estimation of the content of ammonium ions by the colorimetric method, the concentration of ammonium ions was found to be 0.8 ppm, and the rate of removal of ammonium ions by this powder proved to be 98.4%.

Example 2

2 g of the sample prepared in Example 1 were added to 150 ml of a solution containing about 50 ppm of $Cd^{++}$ prepared by employing $CdSO_4$, and upon stirring thoroughly, the mixture was left standing for 48 hours. When the content of $Cd^{++}$ in the supernatant liquid of the mixture after leaving it standing as above was analyzed by the atomic absorption method, it was found to be 8.5 ppm, and the rate of removal of $Cd^{++}$ by this sample proved to be 80.3%.

Example 3

250 ml of an aqueous solution of 5N sodium hydroxide were added to 50 g of waste catalyst, and the mixture was subjected to 48 hours' treatment at 95°C. Subsequent to this treatment, the catalyst was separated, washed with water and dried thereafter, whereby there was obtained a powder. When this powdery sample was subjected to identification by the diffraction of X-rays, it proved to consist essentially of hydroxy sodalite. This powder was added to an aqueous solution of ammonium chloride of the same conditions as that in Example 1, and after 3 hours' stirring, the content of ammonium ions in the supernatant liquid of the resulting mixture was estimated by the colorimetric method to find that it was 0.15 ppm. The rate of removal of ammonium ions by the present sample proved to be more than 99%.

Example 4

A mixture obtained by adding the same $Cd^{++}$ solution as that in Example 2 to the same sample as that in Example 3 under the same conditions as in Example 2 was left standing for 48 hours. The concentration of $Cd^{++}$ in the supernatant liquid of the thus treated mixture was 21 ppm, showing that the rate of removal of $Cd^{++}$ was lower than that in Example 2.

What is claimed is:

1. A method of treating waste silica-alumina catalyst particles previously used in a fluid-bed type catalytic cracking process, which consists essentially of the steps of: soaking said waste catalyst particles in an aqueous sodium hydroxide solution having a concentration of from 0.2N to 5N, at a temperature in the range of 70° to 105°C, for from 2 to 48 hours, employing a ratio of from 50 to 100 ml of said aqueous sodium hydroxide solution per 10 grams of said waste catalyst particles; removing the catalyst particles from said aqueous sodium hydroxide solution, washing said particles and drying them to obtain a powder useful for removing ammonium ions and heavy metal ions from waste water.

2. A method according to claim 1, wherein said silica-alumina catalyst grains have a mean diameter of about 200μ.

* * * * *